June 21, 1960  G. A. SLATER  2,941,706
MOTOR VEHICLE CARRIER

Filed May 26, 1958  2 Sheets-Sheet 1

INVENTOR.
GEORGE A. SLATER
BY

June 21, 1960 G. A. SLATER 2,941,706
MOTOR VEHICLE CARRIER
Filed May 26, 1958 2 Sheets-Sheet 2
FIG - 4
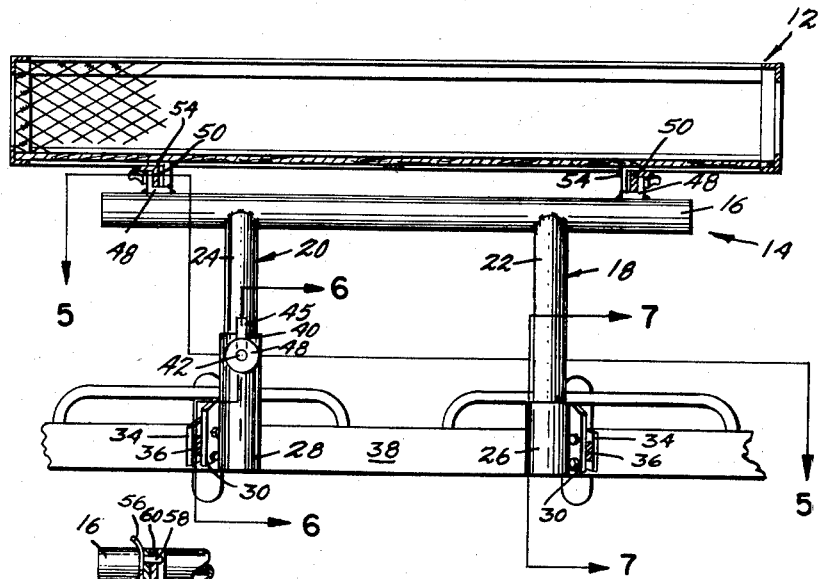
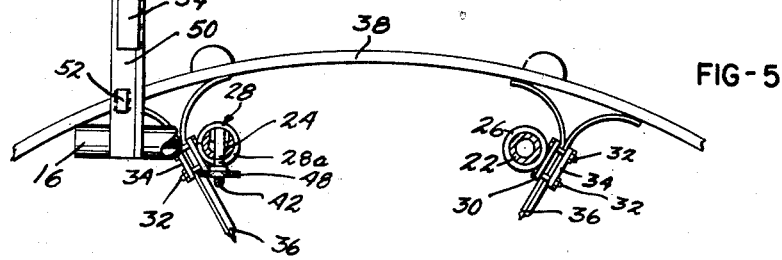
FIG - 5
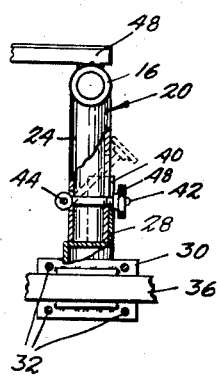
FIG - 6
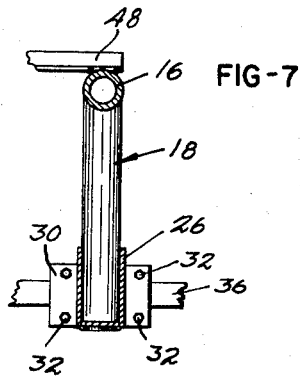
FIG - 7
INVENTOR.
GEORGE A. SLATER
BY

United States Patent Office 2,941,706
Patented June 21, 1960

2,941,706

MOTOR VEHICLE CARRIER

George A. Slater, 103 E. Crown, Spokane, Wash.

Filed May 26, 1958, Ser. No. 737,773

2 Claims. (Cl. 224—42.08)

This invention relates to motor vehicles, and more particularly to an auxiliary carrier for a motor vehicle.

It is an object of the present invention to provide an auxiliary carrier for a motor vehicle which is adapted to be secured on the vehicle to a bumper or the bumper braces and thus dispose the carrier box at a convenient location.

A further object of the present invention lies in the provision of an auxiliary carrier for a motor vehicle which is pivotally supported at the rear of a vehicle and selectively secured so that it may be displaced to enable one to open the deck lid for access to the rear compartment and yet so constructed and designed as to preclude the necessity of removing the carrier for such accessibility.

A still further object of the present invention lies in the provision of an auxiliary carrier for a motor vehicle which is adapted to be mounted at the rear of the vehicle upon the bumper or bumper braces, and has means for adjusting the carrier box longitudinally of the vehicle to accommodate a load which may be, for the time being, supported therein.

Yet another object of the invention lies in the provision of an auxiliary carrier for a motor vehicle which is constructed from a minimum number of parts, assembled with facility, and thus provides a carrier which is admirably adapted for its intended use, is inexpensive to manufacture, and is easily installed and removed from the vehicle.

These and other important objects of the present invention will become apparent during the course of the following specification when considered in conjunction with the accompanying drawing, wherein like numerals are employed to designate like parts. It should be understood that the drawings are exemplifying only and are not intended to limit the invention except insofar as it is expressly defined in the appended claims.

In the drawings:

Figure 4 is an enlarged view partially in cross section taken substantially on the plane indicated by line 4—4 of Figure 1 and looking in the direction of the arrows;

Figure 5 is a fragmentary horizontal cross section taken substantially on the planes indicated by the lines 5—5 of Figure 4 and looking in the direction of the arrows;

Figure 6 is a fragmentary vertical cross section taken on the planes indicated by line 6—6 of Figure 4 and looking in the direction of the arrows; and Figure 7 is a vertical view partially in cross section and taken substantially on the plane indicated by line 7—7 of Figure 4 and looking in the direction of the arrows.

Figure 1:
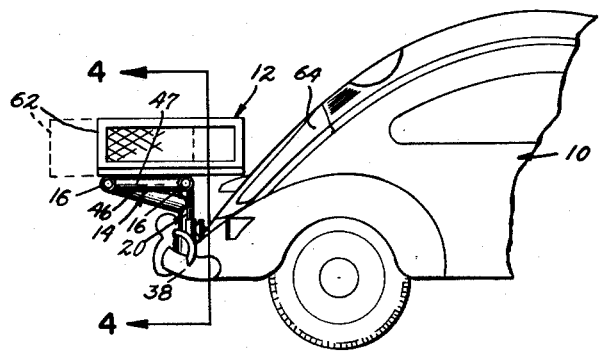
Figure 1 is a side elevation of my improved auxiliary carrier attached to a motor vehicle commonly marketed today under the trade name "Volkswagen"

Referring now more particularly to the drawings, I have disclosed a motor vehicle 10 which may be any one of the many common motor vehicles or a similar one. I have disclosed a motor vehicle commonly marketed under the tradename "Volkswagen" because I find the auxiliary carrier of my design most practical for this use. It is obvious, however, that it is not limited to such use, but with very slight modifications with respect to dimensions it can be employed with others of the presently known motor vehicles.

The auxiliary carrier is designated by the numeral 12 and comprises a frame 14 which has a pair of horizontal parallel bars 16—16 extending laterally of the motor vehicle 10.

Standards 18 and 20 have male members 22 and 24 which are welded or otherwise are secured to the forward one of the bars 16 and depend therefrom. At their lower ends, each of the standards has a female member 26 or 28 which is provided with a flat clamp plate 30 welded or otherwise secured thereto. Each plate 30 has a number of bores therein through which clamping bolts 32 extend and pass through aligned bores in a second clamping plate 34 to rigidly clamp the female members 26 and 28 to the bumper braces 36 which support the rear bumper 38 of the motor vehicle 10.

The male member 22 is pivotally supported in the female member 26 to provide for horizontal swinging movement of the frame 14 about a vertical axis coincident to the standard 18.

The female member 28 has a semi-cylindrical saddle or socket 28a adapted to receive laterally the lower end portion of the male member 24. It will be noted especially in Figures 4 and 6 that the remaining semi-cylindrical portion of the female member 28 is provided with a slot 40 which opens upwardly from the end thereof and is adapted to receive the vertically tiltable lock bolt 42 pivoted at 44 in the male member 24 and extending outwardly through an opening 45 formed in the side wall thereof. The lock bolt may be moved between the broken line position of Figure 6 to the full line position thereof and when in the full line position the hand knob 48 may be tightened to releasably secure the frame against pivotal movement in the socket formed by the female member 26.

Oblique brace members 46 extend from the rearward bar 16 to the male members 22 and 24 to adequately support the frame, while cross braces 47 complement and strengthen the said frame.

Guideways 48 which are angular in cross section extend laterally of the bars 16 and longitudinally of the motor vehicle 10 and have their end portions secured to said bars 16.

Figure 3:
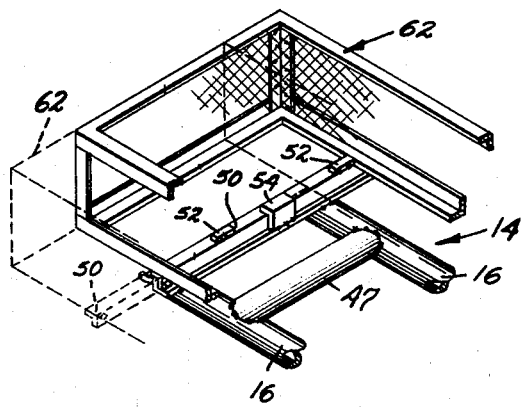
Figure 3 is a fragmentary perspective view showing a portion of the carrier frame and box and by broken lines showing the adjustability feature of the box relative to the frame.

Cooperating angular guides 50 are associated with the guideways 48 for sliding movement therewith, and the movements thereof are limited by means of cooperating spaced stops 52 and stop 54 secured respectively to the guides 50 and the guideways 48 (note Figure 3). In addition, the guideways 48 are provided with resilient fingers 56 which have plungers 58 that pass through openings formed in the guideways 48 and extend into openings 60 formed in the guides 50 to provide for adjustably positioning the guides 50 relative to the guideways 48.

Figure 2:
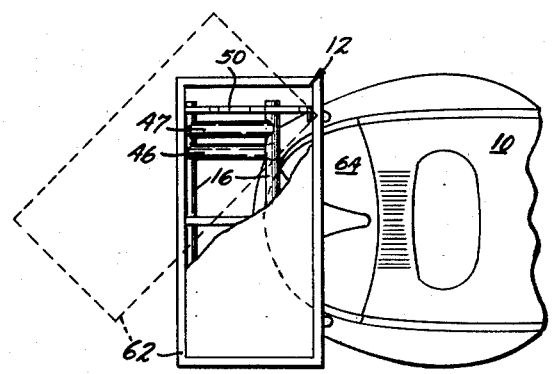
Figure 2 is a top plan view of my auxiliary carrier attached to said vehicle and having parts broken away for convenience of illustration, and showing the carrier disposed in a displaced position by broken lines.

A carrier box 62 is welded or otherwise secured to the guides 50 and is therefore movable to selected positions intermediate the full line and broken line positions disclosed in Figure 1, thus permitting proper positioning of the carrier box with respect to the particular load deposited therein for the time being. The carrier may be pivoted about the axis of the standard 18 as shown by the broken line position of Figure 2 to provide easy access to the deck lid 64 which in the case of the motor vehicle described herein opens to the motor compartment, but which obviously could be the trunk space on other vehicles.

Having thus described my invention, I claim as new and desire to secure by Letters Patent of the United States the following:

1. In a motor vehicle of the class described having a rear bumper supported by bumper braces extending rearwardly from said vehicle, an auxiliary carrier comprising an elongated horizontal frame extending laterally of said vehicle at the rear end thereof; standards extending from the bumper to said frame; each standard including a female element secured to the bumper braces of said vehicle and removably receiving a male element of its respective standard depending from said frame, the male and female elements of one of said standards being pivotally associated to effect horizontal swinging movement of said frame about a vertical axis coincident to said last-named standard, the other of said standards having a semi-cylindrical socket for lateral separation of the standard elements; said socket having an axially parallel slot opening from the upper end thereof, a vertically tiltable lock bolt carried by the male member adapted to cooperate with said socket and disposed to extend through said slot, a hand knob on said bolt for releasably securing the bolt from accidental removal from said slot, whereby the frame is secured against swinging movement; and a carrier box supported upon said frame.

2. The invention as defined in claim 1 and further characterized by guideways and cooperating guides secured one to each of said frame and said carrier box to support said carrier box on said frame for relative movements thereon longitudinally of said vehicle from a forward normal load-carrying position to a rearwardly spaced position.

References Cited in the file of this patent

UNITED STATES PATENTS

| | | |
|---|---|---|
| 1,113,845 | Stevens | Oct. 13, 1914 |
| 1,412,192 | Moore | Apr. 11, 1922 |
| 1,519,894 | Adams | Dec. 16, 1924 |
| 2,394,447 | Hemp | Feb. 5, 1946 |
| 2,620,105 | Erickson | Dec. 2, 1952 |

FOREIGN PATENTS

| | | |
|---|---|---|
| 225,511 | Great Britain | May 28, 1925 |
| 247,380 | Great Britain | Feb. 18, 1926 |
| 614,858 | France | Sept. 25, 1926 |
| 988,712 | France | May 9, 1951 |